UNITED STATES PATENT OFFICE.

OTTO EBERHARD, OF LUDWIGSLUST, GERMANY.

PROCESS OF MAKING MILK EXTRACTS.

SPECIFICATION forming part of Letters Patent No. 712,274, dated October 28, 1902.

Application filed September 20, 1901. Serial No. 75,945. (No specimens.)

*To all whom it may concern:*

Be it known that I, OTTO EBERHARD, a subject of the Emperor of Germany, residing at Ludwigslust, Mecklenburg, Germany, have invented a new and useful Process of Making Milk Extracts Resembling Meat Extracts, of which the following is a specification.

The present invention relates to a process for making a milk extract resembling a meat extract, by which process a better utilization of the milk is obtained. Hitherto the skim-milk or whey freed from fat, casein, and albumen has only been used for producing sugar of milk, while the skim-milk from which the sugar had been removed formed an almost worthless waste product.

In the present process for obtaining a milk extract having a taste somewhat similar to meat extract care is taken during the treatment of skim-milk for obtaining milk-sugar that the concentrated skim-milk which is obtained is always well sterilized. For this purpose such preservatives are employed as will evaporate of themselves or that may be easily removed from the skim-milk in order that no foreign substances may remain in the extract. The most suitable preservative of all these which may be employed is formaldehyde or rather formalin, a solution of formaldehyde. Instead of the addition of such preservatives, however, the milk may be sterilized several times with a like effect.

My process for making a milk extract similar to meat extract may be explained as follows by way of example: The casein is separated from fresh skim-milk obtained in the ordinary manner by means of a centrifugal apparatus and as far as possible freed from fat by means of rennet or by acidulating with lactic acid or hydrochloric acid or with other suitable acids and freed from the fluid in a filtering-bag or the like. The liquid running from the centrifugal apparatus is vigorously boiled with direct steam after dilution to 15° Baumé, again centrifugaled, and the cakes of albumen separated out washed with cold water. The whole liquid freed from albumen is evaporated *in vacuo* to about 35° Baumé and then again about one-tenth to one-fourth per mille of formalin is added, and it is allowed to crystallize and again centrifugaled. The liquor discharged from the centrifugal is evaporated *in vacuo* to about half its volume and then allowed to run into a copper tin-plated boiling-pan having a double bottom and is caused to boil vigorously therein. Then as much alkali or alkaline salt is added thereto as will make the liquid slightly alkaline. This causes a fresh precipitation, which produces a better clarifying and facilitates filtration. If it be desired to obtain a clear soluble extract, this method of clarifying before the filtration is very advisable. The substance is then filtered hot through a filter-press, if desired, after the addition of kieselguhr (silicious sinter) or the like, and by means of a suitable acid—such, for instance, as phosphoric acid or hydrochloric acid—it is rendered slightly acid and the filtrate is evaporated *in vacuo* to the consistency of thick syrup. The extract thus obtained completely replaces in many cases meat extract, more particularly as an addition to sauces or meat soups and other foods containing meat. In order that the extract may be suitable for making bullion without necessitating a simultaneous addition of meat thereto, another method of carrying out the process hereinbefore described may be adopted. In this modified method the milk-extract solution, which has been concentrated to about 10° to 12° Baumé, has fresh disintegrated meat added to it. The extract of the meat is rapidly extracted in an unchanged condition by the salt contained in the solution of milk extract. The fluid thus obtained after the meat residue has been pressed out is heated until the albumen coagulates, then clarified and evaporated.

As milk extract has no specific taste of itself, different kinds of extracts may be obtained, according to the meat which is used—for instance, crab-milk extract by an extract of crab-meat and ox-tail milk extract by making an extract from ox-tails with a somewhat-concentrated milk extract.

Having thus fully described my invention, what I claim as new, and desire to secure by Letters Patent of the United States, is—

1. The process herein described for making a milk extract resembling meat extract, comprising the separation of the casein from skim-milk, freeing the liquid from fat as far as possible, filtering and boiling the same, diluting to about 15° Baumé, separating albumen from the liquid, evaporating to about 35° Baumé, adding solution of formaldehyde, evaporating to half-volume, boiling, precipitating by addition of alkali, adding kieselguhr, and slightly acidulating, substantially as described.

2. The process herein described for making a milk extract resembling meat extract, comprising the separation of the casein from skim-milk, freeing the liquid from fat as far as possible, filtering and boiling the same, diluting to about 15° Baumé, separating albumen from the liquid, evaporating to about 35° Baumé, adding solution of formaldehyde, evaporating to half-volume, boiling, precipitating by addition of alkali, adding kieselguhr, slightly acidulating, concentrating to 10° to 12° Baumé, adding disintegrated meat, and pressing out the meat residue, substantially as described.

In witness whereof I have hereunto set my hand in presence of two witnesses.

OTTO EBERHARD.

Witnesses:
   ERNEST H. L. MUMMENHOFF,
   T. CHRIST. HAFERMANN.